United States Patent
Agarwal et al.

(10) Patent No.: US 12,254,213 B2
(45) Date of Patent: Mar. 18, 2025

(54) WRITE REQUEST BUFFER CAPABLE OF RESPONDING TO READ REQUESTS

(71) Applicant: Micron Technology, Inc., Boise, ID (US)

(72) Inventors: Nikesh Agarwal, Bangalore (IN); Laurent Isenegger, Morgan Hill, CA (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 336 days.

(21) Appl. No.: 17/558,465

(22) Filed: Dec. 21, 2021

(65) Prior Publication Data
US 2023/0195368 A1 Jun. 22, 2023

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0659* (2013.01); *G06F 3/0679* (2013.01); *G06F 12/0238* (2013.01)

(58) Field of Classification Search
CPC .... G06F 3/0656; G06F 3/0604; G06F 3/0659; G06F 3/0679; G06F 12/0238; G06F 3/061; G06F 13/1605; G06F 13/1642; G06F 3/0611; G06F 3/0658; G06F 12/02; G06F 3/06
See application file for complete search history.

(56) References Cited

U.S. PATENT DOCUMENTS

| | | | | |
|---|---|---|---|---|
| 7,340,577 | B1 * | 3/2008 | Van Dyke | G06F 13/4243 711/167 |
| 7,908,429 | B2 * | 3/2011 | Pyeon | G06F 13/4243 710/52 |
| 11,467,959 | B1 * | 10/2022 | Yeung | G06F 12/1027 |
| 11,604,735 | B1 * | 3/2023 | Segev | G06F 12/0857 |
| 2017/0068456 | A1 * | 3/2017 | Toge | G06F 3/0679 |

(Continued)

OTHER PUBLICATIONS

R. Lachaize and J. S. Hansen, "A distributed shared buffer space for data-intensive applications," CCGrid 2005. IEEE International Symposium on Cluster Computing and the Grid, 2005., Cardiff, UK, 2005, pp. 913-920.*

*Primary Examiner* — Pierre Michel Bataille
(74) *Attorney, Agent, or Firm* — Colby Nipper PLLC (57) ABSTRACT

Described apparatuses and methods relate to a write request buffer for a memory system that may support a nondeterministic protocol. A host device and connected memory device may include a controller with a read queue and a write queue. A controller includes a write request buffer to buffer write addresses and write data associated with write requests directed to the memory device. The write request buffer can include a write address buffer that stores unique write addresses and a write data buffer that stores most-recent write data associated with the unique write addresses. Incoming read requests are compared with the write requests stored in the write request buffer. If a match is found, the write request buffer can service the requested data without forwarding the read request downstream to backend memory. Accordingly, the write request buffer can improve the latency and bandwidth in accessing a memory device over an interconnect.

31 Claims, 7 Drawing Sheets

(56) References Cited

U.S. PATENT DOCUMENTS

| | | | |
|---|---|---|---|
| 2017/0123877 A1* | 5/2017 | Gongloor | G06F 11/3466 |
| 2019/0129633 A1* | 5/2019 | Wang | G06F 12/0238 |
| 2019/0205244 A1* | 7/2019 | Smith | G06F 3/065 |
| 2019/0243700 A1* | 8/2019 | Brewer | H04L 69/18 |
| 2020/0310986 A1* | 10/2020 | Kang | G06F 12/10 |
| 2021/0181966 A1* | 6/2021 | Xu | G06F 3/061 |
| 2022/0114102 A1* | 4/2022 | Wang | G06F 12/0868 |
| 2022/0147470 A1* | 5/2022 | Lee | G06F 13/4022 |
| 2023/0195314 A1* | 6/2023 | Yoshihara | G11C 16/08 |
| | | | 711/154 |

* cited by examiner

WRITE REQUEST BUFFER CAPABLE OF RESPONDING TO READ REQUESTS

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and nonvolatile memory (e.g., flash memory). Like the number of cores or speed of a processor, the rate at which data can be accessed, and the delaying in accessing it can impact an electronic device's performance.

Memory demands in electronic devices continue to evolve and grow. For example, as manufacturers engineer processors to execute code faster, processors benefit from accessing data in memories more quickly. Applications on electronic devices may also operate on ever-larger data sets that require ever-larger memories.

BRIEF DESCRIPTION OF THE DRAWINGS

This document describes apparatuses and techniques for a write request buffer with reference to the following drawings. The same numbers are used throughout the drawings to reference like features and components.

DETAILED DESCRIPTION

Overview

Processors and memory work in tandem to provide features on computers and other electronic devices, including smartphones. An electronic device can generally provide enhanced features, such as high-resolution graphics and artificial intelligence, as a processor-and-memory tandem operate faster. Some applications, like those for artificial intelligence and virtual-reality graphics, demand increasing amounts of memory. Advances in processors have often outpaced those in the connections between the processor and memory.

Processors and memories can be secured to a printed circuit board (PCB), such as a motherboard. The PCB can include sockets for accepting at least one processor and one or more memories and various wiring infrastructure that enable communication between two or more components. The PCB, however, offers a finite area for the sockets and the wiring infrastructure. Some PCBs include sockets that are shaped into linear slots and are designed to accept multiple double-inline memory modules (DEVIMs). These sockets can be fully occupied by DEVIMs while a processor is still able to utilize more memory. In such situations, the system can have improved performance if more memory were available.

Printed circuit boards may also include at least one peripheral component interconnect (PCI) express (PCI Express®) (PCIe) slot. PCIe is designed to provide a common interface for various types of components that may be coupled to a PCB. Compared to some older standards, PCIe can provide higher rates of data transfer or a smaller footprint on the PCB, including both greater speed and smaller size. PCIe links enable interconnection of processors and peripheral memory devices at increased speeds compared to older standards. Accordingly, some PCBs enable a processor to access a memory device that is connected to the PCB via a PCIe slot.

PCIe links, however, have limitations in an environment with large, shared memory pools and devices that require high bandwidth and low latency. For example, PCIe links do not specify mechanisms to support coherency and often cannot efficiently manage isolated pools of memory. In addition, the latency for PCIe links can be too high to efficiently manage shared memory access across multiple devices within a system.

As a result, accessing a memory solely using a PCIe protocol may not offer as much functionality, flexibility, or reliability as is desired. In such cases, another protocol can be layered on top of the PCIe protocol. An example of another, higher-level protocol is the Compute Express Link (CXL) protocol or standard (referred to hereinafter as "the CXL protocol" or "the CXL standard"). The CXL protocol can be implemented over a physical layer that is governed by, for instance, the PCIe protocol. The CXL protocol targets intensive workloads for processors and memory devices (e.g., accelerators, memory expanders), where efficient, coherent memory access or interactions between processors and memory is required. The CXL protocol addresses some of the limitations of PCIe links by providing an interface that leverages the PCIe 5.0 physical layer and electricals, while providing lower-latency paths for memory access and coherent caching between processors and memory devices. It offers high-bandwidth, low-latency connectivity between host devices (e.g., processors, CPUs, SoCs) and memory devices (e.g., accelerators, memory expenders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing.

Various electronic devices, such as a mobile phone with a system-on-chip (SoC) or a cloud-computing server with dozens of processing units, may employ memory that is coupled to a processor via a CXL-based interconnect (which can be referred to as a "CXL link" in this document). For clarity, consider an apparatus with a host device that is coupled to a memory device via a CXL link. The host device can include a processor and a controller (e.g., a host-side controller) that is coupled to the interconnect. The memory device can include another controller (e.g., a memory-side controller) that is coupled to the interconnect and one or more memory arrays to store information in static RAM (SRAM), dynamic RAM (DRAM), flash memory, and so forth.

During operation, the host-side controller issues memory requests to the memory-side controller over the interconnect. The memory request may be a read request or a write request. The memory-side controller receives the request and directly or indirectly uses the memory arrays to fulfill the memory request with a memory response. Thus, the memory-side controller sends the memory response to the host-side controller via the interconnect. To fulfill a read request, the memory-side controller returns the requested data as the memory response. To fulfill a write request, the memory-side controller can acknowledge that the write operation was completed as the memory response.

While the CXL protocol addresses the issue of high latency of PCIe links, the latency for a read request from the processor can still be considerably high due to request and response flit packaging and unpackaging over CXL links (e.g., at the CXL initiator and CXL device) and various other queuing and scheduling delays. Additionally, the flit payload overhead reduces the effective bandwidth of a CXL link.

In addition, CXL links can cause systems to incur additional latencies associated with the placement of memory controllers. For example, traditional DIMM-attached systems directly connect the memory to the processor to optimize memory-access latency by mostly implementing access methods in the memory controllers. This design generally reduces the memory-access latency due to page hits and page conflicts. However, in systems with a CXL link, the memory controller operates after the processor (e.g., the CXL Initiator) sends the request over the CXL link to the memory device (e.g., the CXL Device) as a flit. Once the flit is unpackaged at the memory device, the request is forwarded to the memory controller. As a result, the request in a CXL system can incur latency from different blocks in the transmission chain before the request (e.g., a read request) reaches the memory controller and backend memory. Simulation data shows that up to seventy to eighty percent of the read latency incurred by a processor in a CXL system is after the request is packaged as a flit and received by the memory device.

To improve performance of a CXL system, this document describes a write request buffer. For example, a link controller (e.g., a CXL controller) can employ a write request buffer in the write request path to store unique write requests and the associated write data. The write request buffer can be included in the link controller of a host device (e.g., a processor, a CXL Initiator) or anywhere else along the write request path (e.g., the CXL controller of the memory device or the CXL Target). The write request buffer stores the write request along with the write data instead of flushing the write request once transmitted across the interconnect to the memory device or otherwise forwarded downstream toward the backend memory.

At least part of the write request buffer can also be coupled along the read request path. Addresses of incoming host reads are compared with the write addresses of write requests stored in the write request buffer. If a match is found, the read request can bypass the interconnect, and the read request is fulfilled without sending the read request over the interconnect to the memory device. The described write request buffer can improve performance metrics (e.g., both memory bandwidth and latency) for memory accesses by the host device. For example, the read latency for a processor can be improved by about twenty to forty percent and the bandwidth of the processor can be improved by about five to ten percent.

Example Operating Environments

Figure 1:
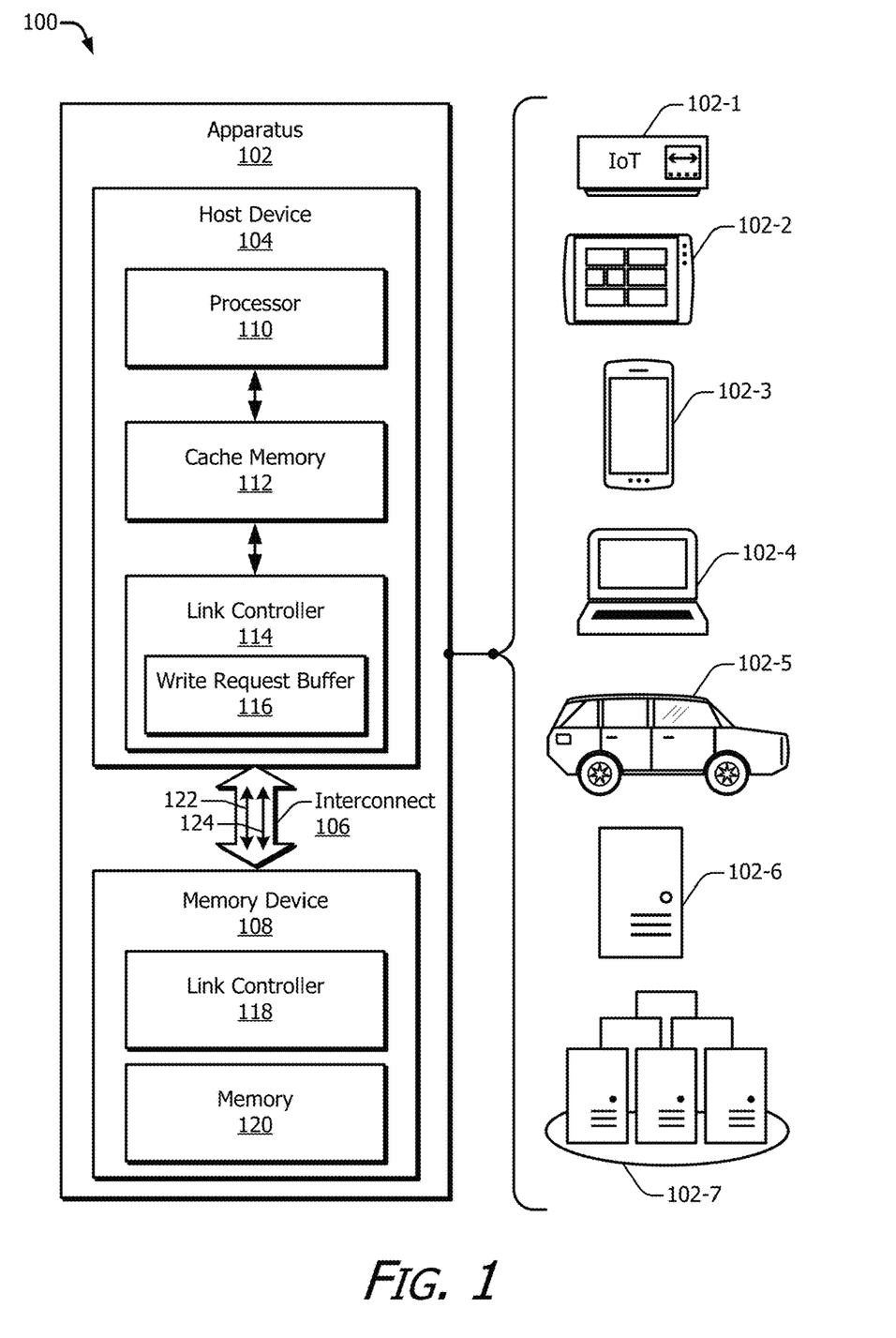
FIG. 1 illustrates example apparatuses that can implement a write request buffer.

FIG. 1 illustrates, at 100 generally, an example apparatus 102 that can implement a write request buffer. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure or a data center or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a link controller 114. The memory device 108, which can be also be a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the link controller 114. The processor 110 is also coupled, directly or indirectly, to the link controller 114. The host device 104 may include other components to form, for instance, a system-on-a-chip (SoC). The processor 110 may include a general-purpose processor, central processing unit (CPU), graphics processing unit (GPU), neural network engine or accelerator, application-specific integrated circuit (ASIC), field-programmable gate array (FPGA) integrated circuit (IC), or communications processor (e.g., a modem or baseband processor).

In operation, the link controller 114 can provide a high-level or logical interface between the processor 110 and at least one memory (e.g., an external memory). The link controller 114 can, for example, receive memory requests from the processor 110 and provide the memory requests to external memory with appropriate formatting, timing, and reordering. The link controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

The interconnect 106 can include at least one command and address bus 122 (CA bus 122) and at least one data bus 124 (DQ bus 124). Each bus may be a unidirectional or a bidirectional bus. The CA bus 122 and the DQ bus 124 may couple to CA and DQ pins, respectively, of the memory device 108. In some implementations, the interconnect 106 may also include a chip-select (CS) I/O (not illustrated in FIG. 1) that can, for example, couple to one or more CS pins of the memory device 108. The interconnect 106 may also include a clock bus (CK bus—not illustrated in FIG. 1) that is part of or separate from the CA bus 122.

The interconnect 106 can be a CXL link. In other words, the interconnect 106 can comport with at least one CXL standard or protocol. The CXL link can provide an interface on top of the physical layer and electricals of the PCIe 5.0 physical layer. The CXL link can cause requests to and responses from the memory device 108 to be packaged as flits. An example implementation of the apparatus 102 with a CXL link is discussed in greater detail with respect to FIG. 4. In other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the link controller 114. A memory (e.g., the memory device 108) may have an "internal" or "local" cache memory. As another example, the apparatus 102 may include cache memory between the interconnect 106 and the memory device 108. Computer engineers can also include the illustrated components in distributed or shared memory systems.

Computer engineers may implement the host device 104 and the various memories in multiple manners. In some cases, the host device 104 and the memory device 108 can be disposed on, or physically supported by, a PCB (e.g., a rigid or flexible motherboard). The host device 104 and the memory device 108 may additionally be integrated on an IC or fabricated on separate ICs packaged together. The memory device 108 may also be coupled to multiple host devices 104 via one or more interconnects 106 and may respond to memory requests from two or more host devices 104. Each host device 104 may include a respective link controller 114, or the multiple host devices 104 may share a link controller 114. This document describes an example computing system architecture with at least one host device 104 coupled to the memory device 108 with reference to FIG. 2.

Two or more memory components (e.g., modules, dies, banks, or bank groups) can share the electrical paths or couplings of the interconnect 106. In some implementations, the CA bus 122 transmits addresses and commands from the link controller 114 to the memory device 108, which may exclude propagating data. The DQ bus 124 can propagate data between the link controller 114 and the memory device 108. The memory device 108 can also include a link controller 118 that is similar to the link controller 114 of the host device 104. The link controllers 114 and 118 can, for example, package and unpackage requests and responses in the appropriate format (e.g., as a flit) for transmission over the interconnect 106. The memory device 108 includes memory 120, which may include multiple memory banks (not illustrated in FIG. 1). The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or an SoC of the apparatus 102. In some implementations and as discussed in greater detail with respect to FIG. 2, the write request buffer 116 can also be incorporated into the memory device 108 at the link controller 118 or at another functional position between the interconnect 106 and the memory 120.

As illustrated in FIG. 1, the link controller 114 can include the write request buffer 116. For example, the link controller 114 (e.g., a CXL controller) can employ the write request buffer 116 in the write request path to store unique write requests and their data. The write request buffer 116 can be included in the CXL controller of the host device 104 (e.g., a CXL initiator) or anywhere else along the write request path (e.g., the link controller 118 of the memory device 108). The write request buffer 116 can store write requests and the associated write data instead of flushing the write requests once transmitted across the interconnect 106 to the memory device 108. The write request buffer 116 can compare incoming read requests with the write requests stored in the write request buffer 116. If a match is found, the read request can bypass the interconnect 106 and the read request can be serviced by the write request buffer 116 to improve performance metrics (e.g., both bandwidth and latency for the host device 104). For example, the read latency for the host device 104 can be improved by about twenty (20) to forty (40) percent, while the host bandwidth can improve by about five to ten percent.

Figure 2:
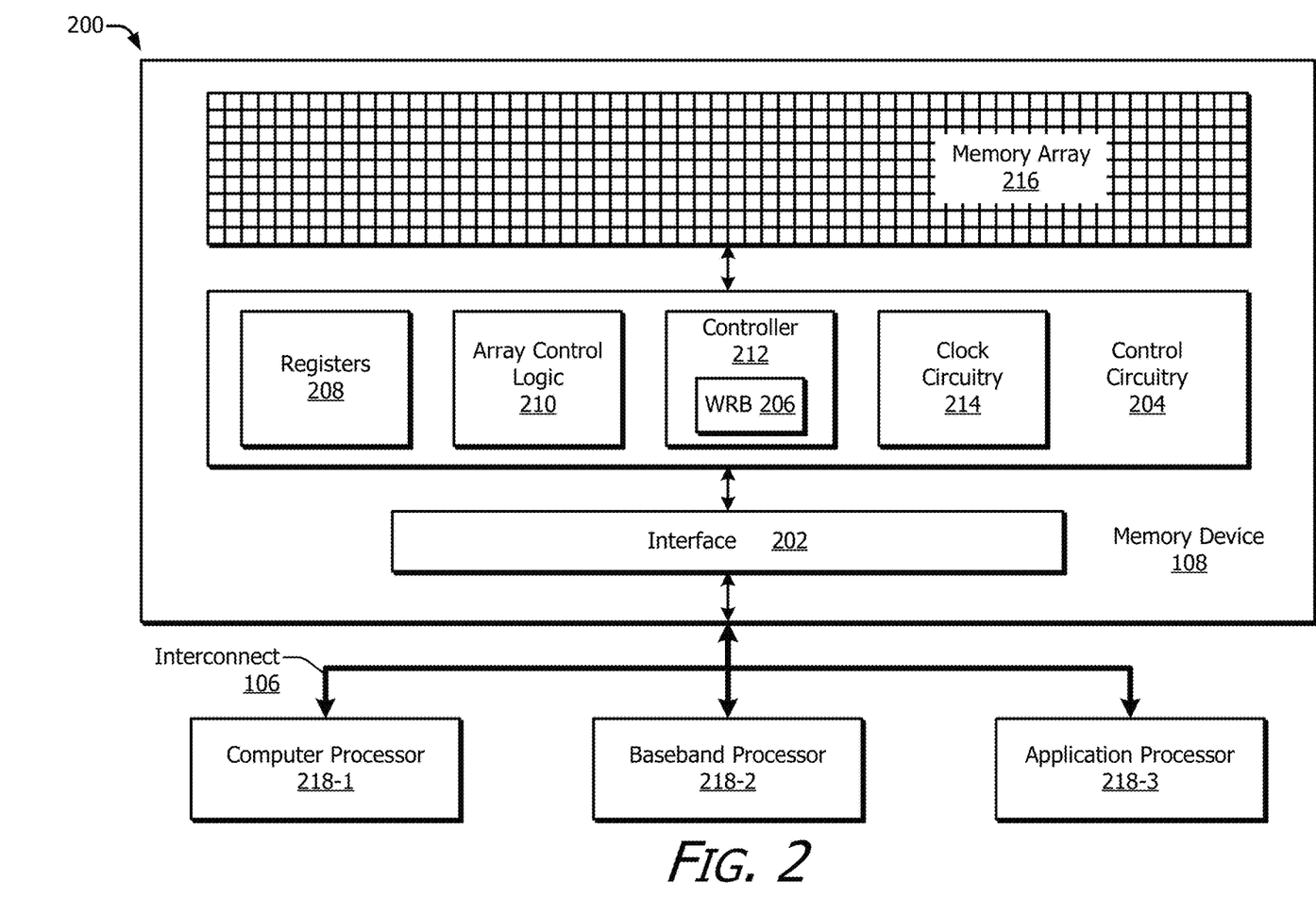
FIG. 2 illustrates an example computing system that can implement aspects of a write request buffer with a memory device.

FIG. 2 illustrates an example computing system 200 that can implement aspects of a write request buffer in a memory device. In some implementations, the computing system 200 includes at least one memory device 108, at least one interconnect 106, and at least one processor 218. In the illustrated implementation, a write request buffer 206 is included in or on the memory device 108.

The memory device 108 can include, or be associated with, at least one memory array 216, at least one interface 202, and control circuitry 204 operatively coupled to the memory array 216. The memory device 108 can correspond to one or more of the cache memory, the main memory, or a storage memory of the apparatus 102 of FIG. 1. Thus, the memory array 216 can include an array of memory cells, including but not limited to memory cells of DRAM, SDRAM, 3D-stacked DRAM, DDR memory, low-power DRAM, or LPDDR SDRAM. For example, the memory array 216 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 108 can range, for instance, from 2 Gb to 32 Gb. The memory array 216 and the control circuitry 204 may be components on a single semiconductor die or on separate semiconductor dies. The memory array 216 or the control circuitry 204 may also be distributed across multiple dies.

The control circuitry 204 can include various components that the memory device 108 can use to perform various operations. These operations can include communicating with other devices, managing memory performance, and performing memory read or write operations. For example, the control circuitry 204 can include one or more registers 208, at least one instance of array control logic 210, a controller 212, and clock circuitry 214. The registers 208 may be implemented, for example, as one or more registers (e.g., a masked-write enablement register) that can store information to be used by the control circuitry 204 or another part of the memory device 108. The array control logic 210 can be circuitry that provides command decoding, address decoding, input/output functions, amplification circuitry, power supply management, power control modes, and other functions. The clock circuitry 214 can synchronize various memory components with one or more external clock signals provided over the interconnect 106, including a command/address clock or a data clock. The clock circuitry 214 can also use an internal clock signal to synchronize memory components.

The controller 212 includes the write request buffer 206. For example, the controller 212 can employ the write request buffer 206 in the write request path to store unique write requests and their data. The write request buffer 206 can be included in a link controller (e.g., the CXL controller) of the memory device 108 or anywhere else along the write request path between the interface 202 and the memory array 216. As described with respect to the write request buffer 116, the write request buffer 206 can store write requests and the associated write data instead of flushing the write requests once transmitted to the memory array 216. The write request buffer 206 can compare incoming read requests with the write requests stored in the write request buffer 206. If a match is found, the read request can bypass the downstream components or functionality of the memory device 108 and the read request can be serviced by the write request buffer 206 to improve performance metrics (e.g., both bandwidth and latency for the at least one processor 218).

The interface 202 can couple the control circuitry 204 or the memory array 216 directly or indirectly to the interconnect 106. As shown in FIG. 2, the registers 208, the array control logic 210, the controller 212, and the clock circuitry 214 can be part of a single component (e.g., the control circuitry 204). In other implementations, one or more of the registers 208, the array control logic 210, the controller 212, or the clock circuitry 214 may be separate components on a single semiconductor die or across multiple semiconductor dies. These components may individually or jointly couple to the interconnect 106 via the interface 202.

The interconnect 106 may use one or more of a variety of interconnects that communicatively couple together various components and enable commands, addresses, or other information and data to be transferred between two or more components (e.g., between the memory device 108 and the processor 218). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 122 and a DQ bus 124 (as illustrated in FIG. 1). As discussed above with respect to FIG. 1, the interconnect 106 can be a CXL link or comport with at least one CXL standard. The CXL link can provide an interface on top of the physical layer and electricals of the PCIe 5.0 physical layer.

In some aspects, the memory device 108 may be a "separate" component relative to the host device 104 (of FIG. 1) or any of the processors 218. The separate components can include a PCB, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 218, by being combined on a PCB or in a single package or an SoC.

The designed apparatuses and methods may be appropriate for memory designed for lower-power operations or energy-efficient applications. An example of a memory standard related to low-power applications is the LPDDR standard for SDRAM as promulgated by the Joint Electron Device Engineering Council (JEDEC) Solid State Technology Association. In this document, some terminology may draw from one or more of these standards or versions thereof, like the LPDDR5 standard, for clarity. The described principles, however, are also applicable to memories that comport with other standards, including other LPDDR standards (e.g., earlier versions or future versions like LPDDR6) and to memories that do not adhere to a standard.

As shown in FIG. 2, the processors 218 may include a computer processor 218-1, a baseband processor 218-2, and an application processor 218-3, coupled to the memory device 108 through the interconnect 106. The processors 218 may include or form a part of a CPU, GPU, SoC, ASIC, or FPGA. In some cases, a single processor can comprise multiple processing resources, each dedicated to different functions (e.g., modem management, applications, graphics, central processing). In some implementations, the baseband processor 218-2 may include or be coupled to a modem (not illustrated in FIG. 2) and referred to as a modem processor. The modem or the baseband processor 218-2 may be coupled wirelessly to a network via, for example, cellular, Wi-Fi®, Bluetooth®, near field, or another technology or protocol for wireless communication.

In some implementations, the processors 218 may be connected directly to the memory device 108 (e.g., via the interconnect 106). In other implementations, one or more of the processors 218 may be indirectly connected to the memory device 108 (e.g., over a network connection or through one or more other devices). Further, the processor 218 may be realized similar to the processor 110 of FIG. 1. Accordingly, a respective processor 218 can include or be associated with a respective link controller, like the link controller 114 illustrated in FIG. 1. Alternatively, two or more processors 218 may access the memory device 108 using a shared link controller 114.

Example Techniques and Hardware

Figure 3:
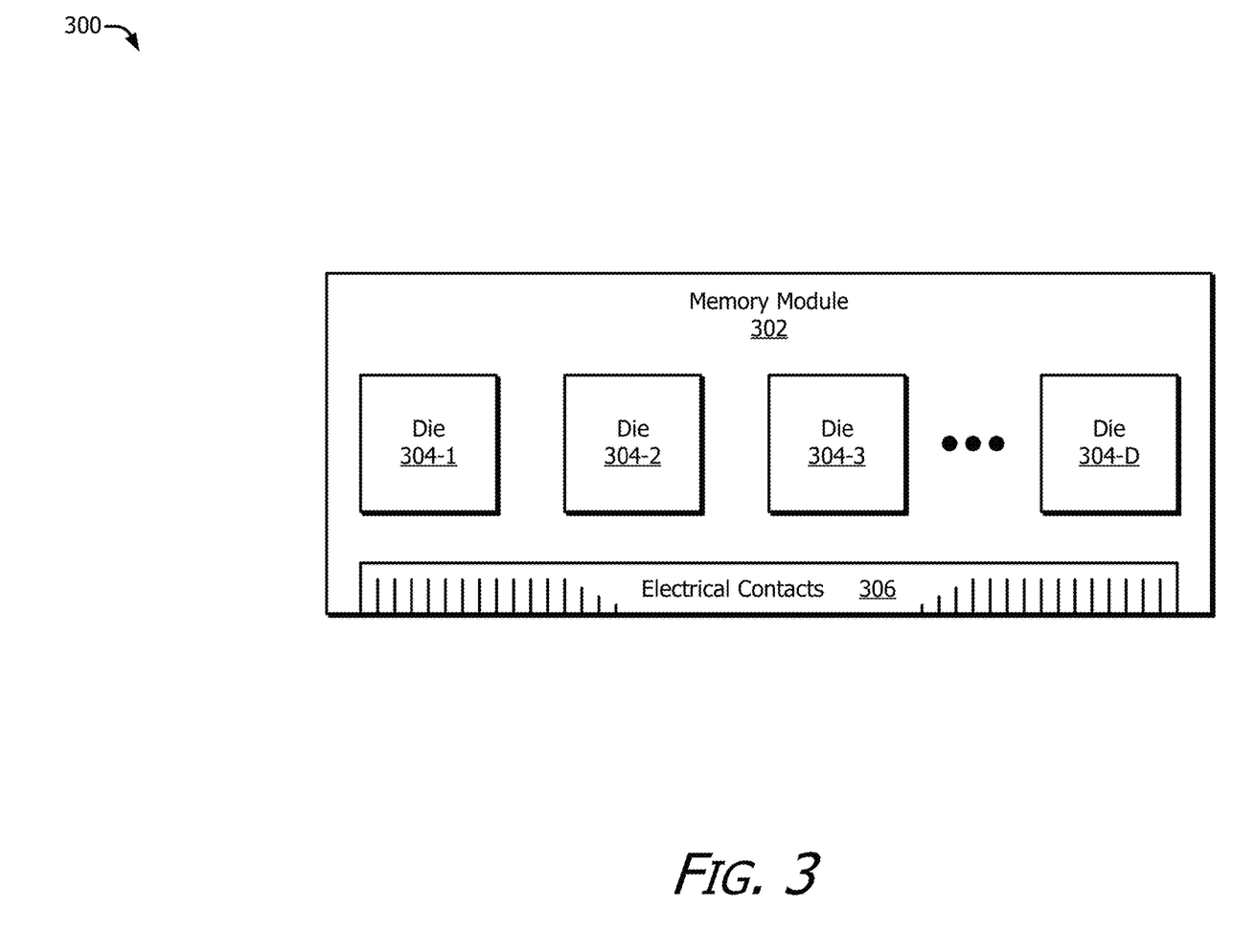
FIG. 3 illustrates an example memory device.

FIG. 3 illustrates an example memory device 300. An example memory module 302 includes multiple dies 304. As illustrated, the memory module 302 includes a first die 304-1, a second die 304-2, a third die 304-3, and a $D^{th}$ die 304-D, with "D" representing a positive integer. As a few examples, the memory module 302 can be a SIMM or a DIMM. As another example, the memory module 302 can interface with other components via a bus interconnect (e.g., a Peripheral Component Interconnect Express (PCIe) bus). The memory device 108 illustrated in FIGS. 1 and 2 can correspond, for example, to a single die 304, multiple dies 304-1 through 304-D, or a memory module 302 with at least one die 304. As shown, the memory module 302 can include one or more electrical contacts 306 (e.g., pins) to interface the memory module 302 to other components.

The memory module 302 can be implemented in various manners. For example, the memory module 302 may include a PCB, and the multiple dies 304-1 through 304-D may be mounted or otherwise attached to the PCB. The dies 304 (e.g., memory dies) may be arranged in a line or along two or more dimensions (e.g., forming a grid or array). The dies 304 may have a similar size or may have different sizes. Each die 304 may be similar to another die 304 or unique in size, shape, data capacity, or control circuitries. The dies 304 may also be positioned on a single side or on multiple sides of the memory module 302.

Figure 4:
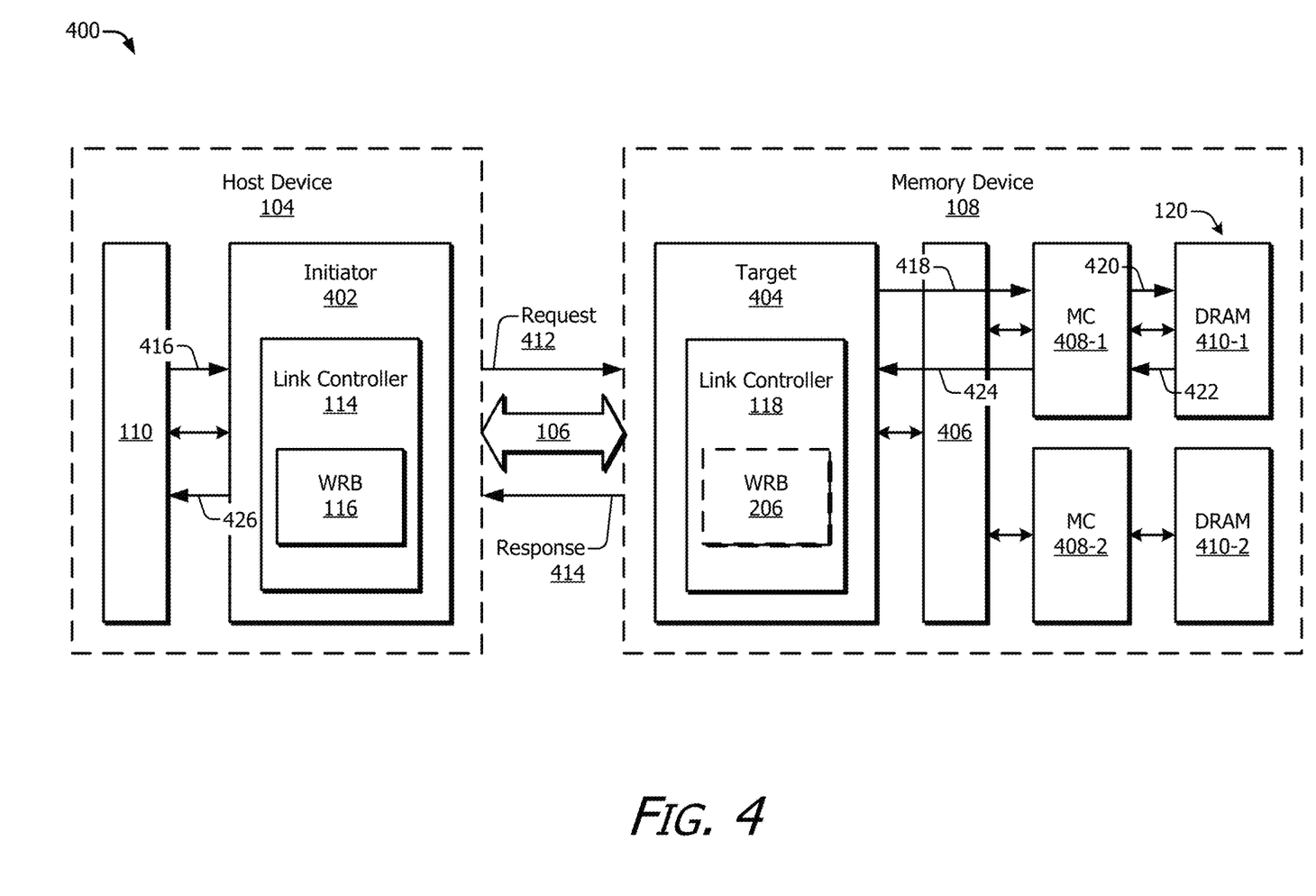
FIG. 4 illustrates an example of a system that includes a host device and a memory device coupled together via an interconnect.

FIG. 4 illustrates an example of a system 400 that includes a host device 104 and a memory device 108 that are coupled together via an interconnect 106. The system 400 may form at least part of an apparatus 102 as shown in FIG. 1. As illustrated, the host device 104 includes a processor 110 and a link controller 114, which can be realized with at least one initiator 402. Thus, the initiator 402 can be coupled to the processor 110 or to the interconnect 106 (including to both), and the initiator 402 can be coupled between the processor 110 and the interconnect 106. Examples of initiators 402 may include a leader, a primary, a master, a main component, and so forth.

In the illustrated example system 400, the memory device 108 includes a link controller 118, which may be realized with at least one target 404. The target 404 can be coupled to the interconnect 106. Thus, the target 404 and the initiator 402 can be coupled to each other via the interconnect 106. Examples of targets 404 may include a follower, a secondary, a slave, a responding component, and so forth. The memory device 108 also includes a memory 120, which may be realized with at least one memory module or other component, such as a DRAM 410, as is described further below.

In example implementations, the initiator 402 includes the link controller 114, and the target 404 includes the link controller 118. The link controller 114 or the link controller 118 can instigate, coordinate, cause, or otherwise control signaling across a physical or logical link realized by the interconnect 106 in accordance with one or more protocols. The link controller 114 may be coupled to the interconnect 106. The link controller 118 may also be coupled to the interconnect 106. Thus, the link controller 114 can be coupled to the link controller 118 via the interconnect 106. Each link controller 114 or 118 may, for instance, control communications over the interconnect 106 at a link layer or at one or more other layers of a given protocol. Communication signaling may include, for example, a request 412 (e.g., a write request or a read request), a response 414 (e.g., a write response or a read response), and so forth.

The memory device 108 may further include at least one interconnect 406 and at least one memory controller 408 (e.g., MC 408-1 and MC 408-2). Within the memory device 108, and relative to the target 404, the interconnect 406, the memory controller 408, and/or the DRAM 410 (or other memory component) may be referred to as a "backend" component of the memory device 108. In some cases, the interconnect 406 is internal to the memory device 108 and may operate the same as or differently from the interconnect 106.

As shown, the memory device 108 may include multiple memory controllers 408-1 and 408-2 and/or multiple DRAMs 410-1 and 410-2. Although two each are shown, the memory device 108 may include one or more memory controllers and/or one or more DRAMs. For example, a memory device 108 may include four memory controllers and 16 DRAMs, such as four DRAMs per memory controller. The memory components of the memory device 108 are depicted as DRAM as only an example, for one or more of the memory components may be implemented as another type of memory. For instance, the memory components may include nonvolatile memory like flash or PCM. Alternatively, the memory components may include other types of volatile memory like SRAM. A memory device 108 may also include any combination of memory types.

In some cases, the memory device 108 may include the target 404, the interconnect 406, the at least one memory controller 408, and the at least one DRAM 410 within a single housing or other enclosure. The enclosure, however, may be omitted or may be merged with an enclosure for the host device 104, the system 400, or an apparatus 102 (of FIG. 1). The interconnect 406 can be disposed on a PCB. Each of the target 404, the memory controller 408, and the DRAM 410 may be fabricated on at least one IC and packaged together or separately. The packaged ICs may be secured to or otherwise supported by the PCB and may be directly or indirectly coupled to the interconnect 406. The components of the memory device 108 may, however, be fabricated, packaged, combined, and/or housed in other manners.

As illustrated in FIG. 4, the target 404, including the link controller 118 thereof, can be coupled to the interconnect 406. Each memory controller 408 of the multiple memory controllers 408-1 and 408-2 can also be coupled to the interconnect 406. Accordingly, the target 404 and each memory controller 408 of the multiple memory controllers 408-1 and 408-2 can communicate with each other via the interconnect 406. Each memory controller 408 is coupled to at least one DRAM 410. As shown, each respective memory controller 408 of the multiple memory controllers 408-1 and 408-2 is coupled to at least one respective DRAM 410 of the multiple DRAMs 410-1 and 410-2. Each memory controller 408 of the multiple memory controllers 408-1 and 408-2 may, however, be coupled to a respective set of multiple DRAMs 410 or other memory components.

Each memory controller 408 can access at least one DRAM 410 by implementing one or more memory access protocols to facilitate reading or writing data based on at least one memory address. The memory controller 408 can increase bandwidth or reduce latency for the memory accessing based on the memory type or organization of the memory components, like the DRAMs 410. The multiple memory controllers 408-1 and 408-2 and the multiple DRAMs 410-1 and 410-2 can be organized in many different manners. For example, each memory controller 408 can realize one or more memory channels for accessing the DRAMs 410. Further, the DRAMs 410 can be manufactured to include one or more ranks, such as a single-rank or a dual-rank memory module. Each DRAM 410 (e.g., at least one DRAM IC chip) may also include multiple banks, such as 8 or 16 banks.

This document now describes examples of the host device 104 accessing the memory device 108. The examples are described in terms of a general access which may include a memory read access (e.g., a retrieval operation) or a memory write access (e.g., a storage operation). The processor 110 can provide a memory access request 416 to the initiator 402. The memory access request 416 may be propagated over a bus or other interconnect that is internal to the host device 104. This memory access request 416 may be or may include a read request or a write request. The initiator 402, such as the link controller 114 thereof, can reformulate the memory access request into a format that is suitable for the interconnect 106. This formulation may be performed based on a physical protocol or a logical protocol (including both) applicable to the interconnect 106. Examples of such protocols are described below.

The initiator 402 can thus prepare a request 412 and transmit the request 412 over the interconnect 106 to the target 404. The target 404 receives the request 412 from the initiator 402 via the interconnect 106. The target 404, including the link controller 118 thereof, can process the request 412 to determine (e.g., extract or decode) the memory access request. Based on the determined memory access request, the target 404 can forward a memory request 418 over the interconnect 406 to a memory controller 408, which is the first memory controller 408-1 in this example. For other memory accesses, the targeted data may be accessed with the second DRAM 410-2 through the second memory controller 408-2.

The first memory controller 408-1 can prepare a memory command 420 based on the memory request 418. The first memory controller 408-1 can provide the memory command 420 to the first DRAM 410-1 over an interface or interconnect appropriate for the type of DRAM or other memory component. The first DRAM 410-1 receives the memory command 420 from the first memory controller 408-1 and can perform the corresponding memory operation. Based on the results of the memory operation, the first DRAM 410-1 can generate a memory response 422. If the memory request 412 is for a read operation, the memory response 422 can include the requested data. If the memory request 412 is for a write operation, the memory response 422 can include an acknowledgement that the write operation was performed successfully. The first DRAM 410-1 can return the memory response 422 to the first memory controller 408-1.

The first memory controller 408-1 receives the memory response 422 from the first DRAM 410-1. Based on the memory response 422, the first memory controller 408-1 can prepare a memory response 424 and transmit the memory response 424 to the target 404 via the interconnect 406. The target 404 receives the memory response 424 from the first memory controller 408-1 via the interconnect 406. Based on this memory response 424, and responsive to the corresponding request 412, the target 404 can formulate a response 414 for the requested memory operation. The response 414 can include read data or a write acknowledgement and be formulated in accordance with one or more protocols of the interconnect 106.

To respond to the memory request 412 from the host device 104, the target 404 can transmit the response 414 to the initiator 402 over the interconnect 106. Thus, the initiator 402 receives the response 414 from the target 404 via the interconnect 106. The initiator 402 can therefore respond to the "originating" memory access request 416, which is from the processor 110 in this example. To do so, the initiator 402 prepares a memory access response 426 using the information from the response 414 and provides the memory access response 426 to the processor 110. In this way, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 402 and the target 404. Generally, the interconnect 106 can carry memory-related information, such as data or a memory address, between the initiator 402 and the target 404. In some cases, the initiator 402 or the target 404 (including both) can prepare memory-related information for communication across the interconnect 106 by encapsulating such information. The memory-related information can be encapsulated into, for example, at least one packet (e.g., a flit). One or more packets may include headers with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Possession of a credit can enable an entity, such as the initiator 402, to transmit another memory request 412 to the target 404. The target 404 may return credits to "refill" a credit balance at the initiator 402. A credit-based communication scheme across the interconnect 106 may be implemented by credit logic of the target 404 or by credit logic of the initiator 402 (including by both working together in tandem). Additionally or alternatively, the link controller 114 can utilize the write request buffer 116 or the link controller 118 can utilize the write request buffer 206 to improve the latency and bandwidth of the initiator 402 in servicing read requests from the processor 110. Example aspects of the write request buffer 116 or the write request buffer 206 are described below with reference to FIGS. 5 through 7.

The system 400, the initiator 402 of the host device 104, or the target 404 of the memory device 108 may operate or interface with the interconnect 106 in accordance one or more physical or logical protocols. For example, the interconnect 106 may be built in accordance with a Peripheral Component Interconnect Express (PCIe or PCI-e) standard. Applicable versions of the PCIe standard may include 1.x, 2.x, 3.x, 4.0, 5.0, 6.0, and future or alternative versions. In some cases, at least one other standard is layered over the physical-oriented PCIe standard. For example, the initiator 402 or the target 404 can communicate over the interconnect 106 in accordance with a Compute Express Link (CXL) standard. Applicable versions of the CXL standard may include 1.x, 2.0, and future or alternative versions. The CXL standard may operate based on credits, such as read credits and write credits. In such implementations, the link controller 114 and the link controller 118 can be CXL controllers.

Figure 5:
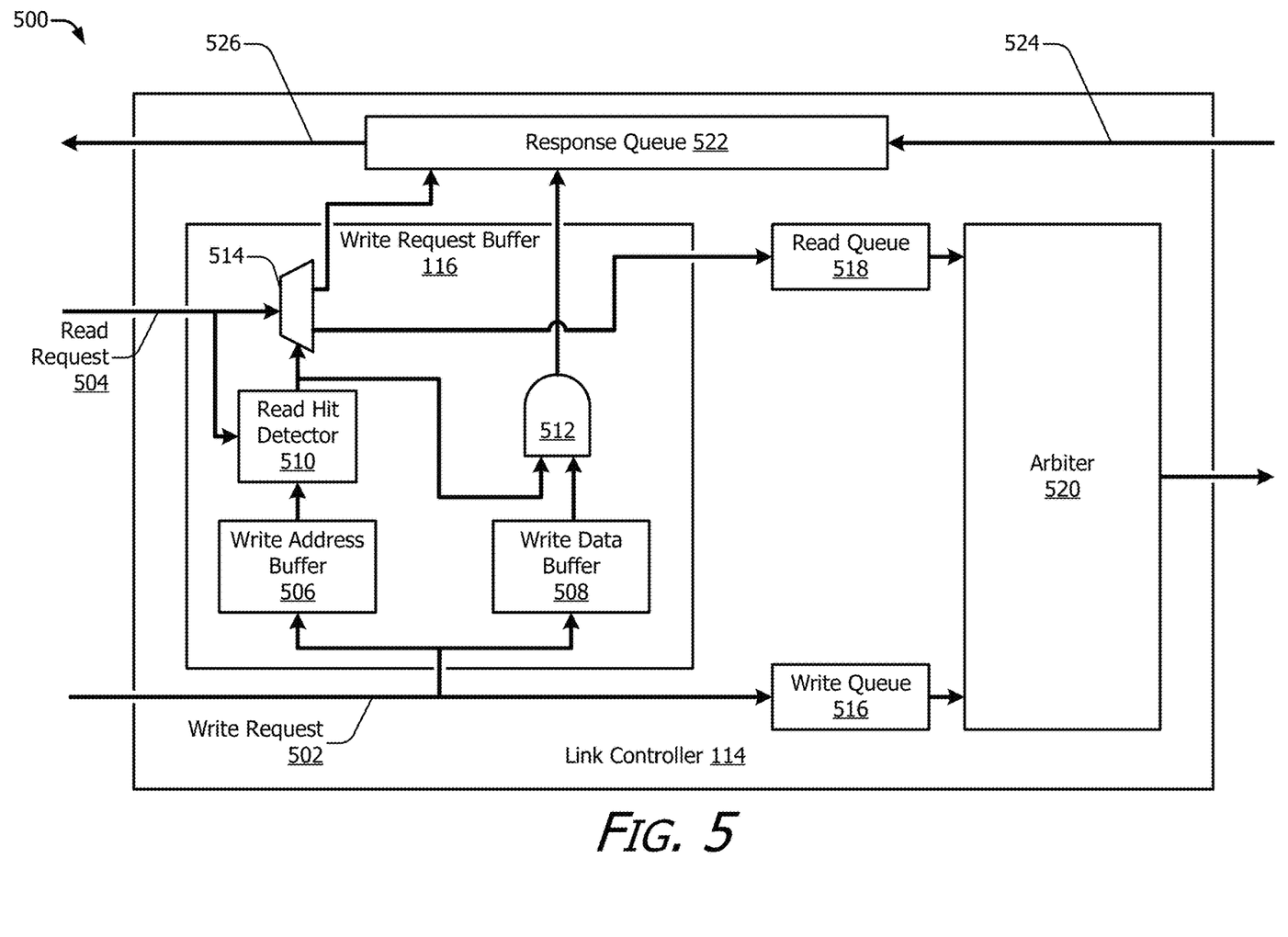
FIG. 5 illustrates an example architecture of a write request buffer.

FIG. 5 illustrates an example architecture 500 of a write request buffer. As shown, the write request buffer 116 is included in the link controller 114 of the host device 104. In other implementations, the write request buffer 116 can be included in the link controller 118 of the memory device 108. In yet other implementations, the write request buffer 116 can be included in other functional positions within the host device 104 or the memory device 108, such as a memory controller 408.

As discussed above, the link controller 114 can receive signaling indicative of write requests 502 and read requests 504 directed to the memory 120 of the memory device 108 (or another memory of the memory device 108 or another connected memory device). The write requests 502 and the read requests 504 or the signaling thereof can be received from the processor 110 directly or indirectly via the cache memory 112. Each write request 502 includes an address (which can be referred to as a "write address" in this document) and data (which can be referred to as "write data" in this document). The write address corresponds to a location within the memory 120 to which the write data is to be written. Each read request 504 includes an address (which can be referred to as a "read address" in this document) that corresponds to a location within the memory 120 from which existing data is to be read.

The write request buffer 116 can include a write address buffer 506, a write data buffer 508, a read hit detector 510, an AND gate 512, and a demultiplexer 514. The write address buffer 506 can be a dedicated portion of the write request buffer 116 to store the write addresses associated with the write requests 502 that are stored in the write request buffer 116. Specifically, the write address buffer 506 can store the write addresses associated with unique write requests. For example, if the write request buffer 116 receives two write requests 502 with the same write address, the write address buffer 506 has a single entry associated with the write address. In other words, the write request buffer 116 or the write address buffer 506 stores a single entry for any given write address of a plurality of addresses associated with the memory 120.

Each write request 502 is also forwarded to a write queue 516. The write queue 516 stores or buffers each write request 502. The write queue 516 deletes, removes, invalidates, or overwrites the write requests 502 after transmitting them across the interconnect 106 or forwarding them to an arbiter 520. The arbiter 520 can manage and prioritize the read requests 504 to improve the read latency for the host device 104 in accessing the memory 120.

The write data buffer 508 can be another dedicated portion of the write request buffer 116 to store the write data associated with the write requests 502 stored in the write request buffer 116. Specifically, the write data buffer 508 can store the write data associated with unique write requests. For example, if the write request buffer 116 receives two write requests 502 with the same write address, the write data buffer 508 has a single entry corresponding to the data for the most-recent write request 502 associated with that write address. In other words, the write request buffer 116 or the write data buffer 508 stores a single, most-recent entry for any given write address of a plurality of addresses associated with the memory 120. The physical or logical position of write data in the write data buffer 508 can represent or reflect a relative age of the associated write request 502.

The write data buffer 508 generally has a fixed size (e.g., four kilobytes, eight kilobytes, sixteen kilobytes). The size of the write data buffer 508 can be determined based on a reuse distance metric. The reuse distance metric represents an average number of unique write request entries to the write request buffer 116 between an incoming read request 504 that has the same read address as the write address of the write request 502 stored in the write request buffer 116.

The read hit detector 510 includes a comparator that can determine whether a read address associated with a read request 504 directed to the memory 120 matches a write address stored in the write request buffer 116 or the write address buffer 506. The read hit detector 510 can be implemented as hardware, software, fixed circuitry, or other logic to perform the described comparison.

The AND gate 512 can use a logical "AND" operation to gate whether the write data stored in the write data buffer 508 is provided to a response queue 522 based on the output of the read hit detector 510. If the read hit detector 510 indicates an address match or hit, then the AND gate 512 forwards, from the write data buffer 508, the write data corresponding to the write address of the write address buffer 506 that matches the read address of the read request 504. In this way, the write request buffer 116 can service the read request 504 without forwarding the read request to the memory device 108 if the read address matches a write address stored in the write request buffer 116.

The demultiplexer 514 can receive the read requests 504 as a single input and transmit the read requests 504 to the appropriate destination based on a hit signal from the read hit detector 510. The hit signal indicates whether the read address of the read request 504 matches a write address stored in the write request buffer 116 or the write address buffer 506. Based on whether the hit signal indicates a match or no match, the demultiplexer 514 transmits the read request 504 to a read queue 518 or the response queue 522. If the hit signal indicates that there was not a match, the demultiplexer 514 transmits the read request 504 to the read queue 518, which forwards the read request to the arbiter 520. The arbiter 520 can then transmit the read request 504 to the memory device 108 via the interconnect 106. If the hit signal indicates a match, the demultiplexer 514 transmits the read request 504 to the response queue 522. The response queue 522 can combine the write data from the write request buffer 116 or the write data buffer 508 with the read request 504 to generate a read response 526. The response queue 522 sends the read response 526 to the processor 110. Generally, the read response 526 can be provided by either the write request buffer 116 as described above or by the memory device 108 as a read response 524 from the memory 120.

In this way, the write request buffer 116 can bypass the interconnect 106 and provide the read response 526 to the host device 104 without sending the read request 504 to the memory device 108. The write request buffer 116 can improve the bandwidth and latency experienced by the host device 104 for accessing the memory 120. For example, the read latency for the processor 110 can be improved by about twenty to forty percent, and the bandwidth can be improved by about five to ten percent.

Example Methods

Figure 6:
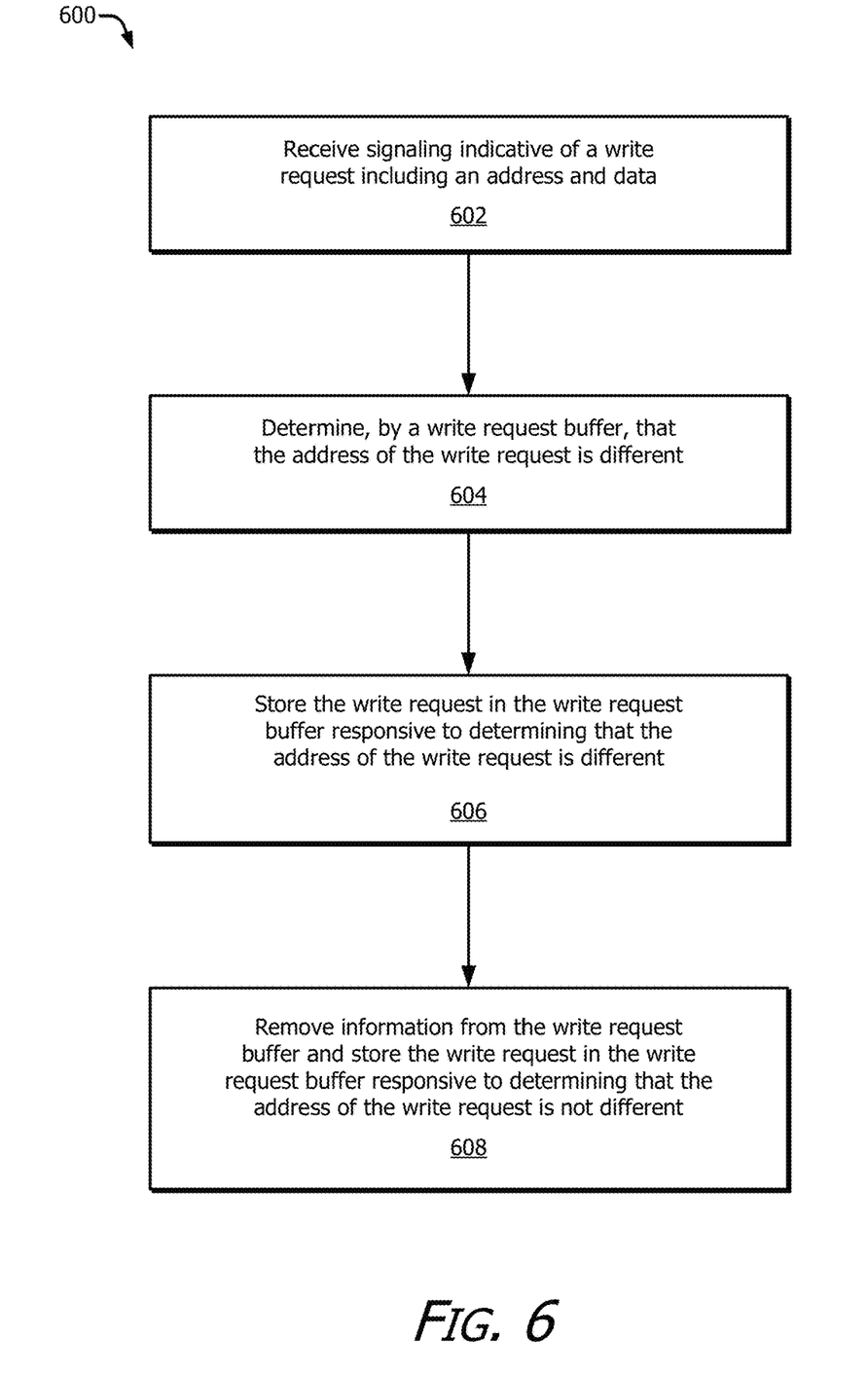
FIG. 6 illustrates a flow diagram of an example process in response to a write request that implements aspects of a write request buffer.
Figure 7:
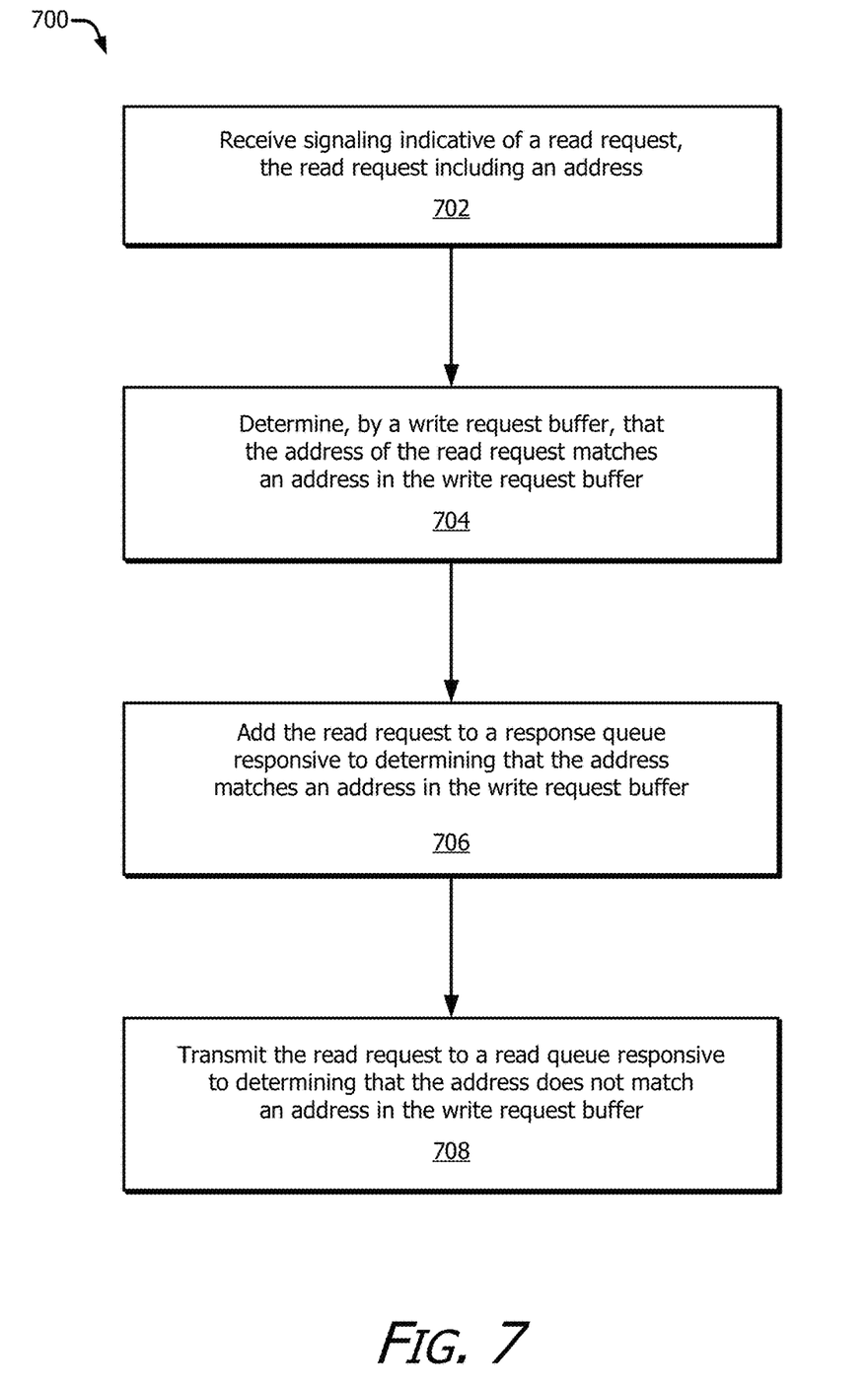
FIG. 7 illustrates a flow diagram of an example process in response to a read request that implements aspects of a write request buffer.

This section describes example methods with reference to the flow chart(s) and flow diagram(s) of FIGS. 6 and 7 for implementing a write request buffer for link controllers. These descriptions may also refer to components, entities, and other aspects depicted in FIGS. 1 through 5, which reference is made only by way of example.

FIG. 6 illustrates a flow diagram of an example process 600 in response to a write request that implements aspects of a write request buffer. The process 600 can be implemented at the link controller 114 of the host device 104 or at the link controller 118 of the memory device 108. In other implementations, the process 600 can be implemented at different functional places in the memory-access chain (e.g., at a memory controller or other controller in the memory device 108).

At block 602, a controller is receiving signaling indicative of a write request directed to a memory device. The write request includes an address and data. For example, the apparatus 102 can operate a package (e.g., the host device 104 and the memory device 108). The link controller 114 of the host device 104 can receive the write request 502 that includes a write address and write data. The write request 502 is directed to the memory 120 of the memory device 108.

At block 604, a write request buffer of the controller is determining that the address of the write request is different from one or more stored write requests in the write request buffer. For example, the write request buffer 116 of the link controller 114 can determine whether the write address of the write request 502 is different from one or more stored write requests 502 in the write request buffer 116. The determination can be made by comparing the write address of the write request 502 with stored write addresses in the write address buffer 506 corresponding to write addresses received in one or more other write requests 502 stored in the write request buffer 116. The write address buffer 506 can be a dedicated portion of the write request buffer 116 to store the write addresses of the write requests 502 stored in the write request buffer 116. In some implementations, the write address buffer 506 or the dedicated portion of the write request buffer 116 can store a single entry for each address of a plurality of addresses associated with the memory 120 of the memory device 108.

At block 606, the write request buffer is storing the write request in the write request buffer responsive to determining that the address of the write request is different. For example, the write request buffer 116 can store the write request 502 in the write request buffer 116 in response to a determination that the write address of the write request 502 is different or unique. The write address associated with the write request 502 can be stored in the write address buffer 506. Similarly, the write data associated with the write request 502 can be stored in the write data buffer 508, which can be another dedicated portion of the write request buffer 116.

The write request buffer 116 can store the write request 502 at an initial position in the write request buffer 116 or at initial positions of the write address buffer 506 and the write data buffer 508. A position of a write request in the write request buffer 116 can represent an order in which the write request 502 was received or stored.

The write request buffer 116 can also determine that the write request buffer 116, the write address buffer 506, or the write data buffer 508 includes a quantity of information that is greater than a threshold. The threshold can be a capacity, depth, number of slots, bits, or other units of storage for the write request buffer 116, the write address buffer 506, or the write data buffer 508. The write request buffer 116 can also remove, invalidate, delete, or overwrite the write address and the write data associated with an oldest write request 502 (e.g., last in) in response to storing the write request 502 and the write request buffer 116, the write address buffer 506, or the write data buffer 508 including a quantity of information that is greater than the threshold. For example, the threshold can be exceeded if the number of write addresses stored in the write address buffer 506 is equal to or exceeds a capacity, depth, slot, or bit size of the write address buffer 506. Similarly, the threshold can be exceeded if the write data stored in the write buffer 116 or the write data buffer 508 is equal to or exceeds a capacity, depth, slot, or bit size of the write buffer 116 or the write data buffer 508, respectively.

At block 608, the write request buffer is removing, invalidating, or overwriting information from the write request buffer and storing the write request in the write request buffer responsive to determining that the address of the write request is not different. The information is among the stored write requests in the write request buffer and has a same address as the address of the write request. For example, in response to determining that the write address of the write request 502 is not different or unique, the write request buffer 116 can remove information (e.g., an older write request 502) from the write request buffer 116 and store the write request 502 in the write request buffer 116. The information (e.g., the older write request 502) has the same write address as the write address of the write request 502. The write address associated with the write request 502 can be stored in the write address buffer 506. Similarly, the write data associated with the write request 502 can be stored in the write data buffer 508.

The write request buffer 116 can store the write request 502 at an initial position of the write request buffer 116. The initial position of the write request buffer 116 can correspond to an initial position of the write address buffer 506 and an initial position of the write data buffer 508. The write request buffer 116 can also remove the write data or the write address associated with the information (e.g., the older write request 502) in response to storing the non-unique write request 502.

The link controller 114 also transmits the write request 502 to the write queue 516 for transmission to the memory device 108. The write request buffer 116 stores the write addresses and the write data associated with the write requests 502 after the link controller 114 transmits the write requests 502 to the memory device 108 via the interconnect 106.

FIG. 7 illustrates a flow diagram of an example process 700 in response to a read request that implements aspects of a write request buffer. The process 700 can be implemented at the link controller 114 of the host device 104 or at the link controller 118 of the memory device 108. In other implementations, the process 700 can be implemented at different functional places in the memory-access chain (e.g., at a memory controller or other controller in the memory device 108). The link controller 114 can be a CXL controller and the interconnect 106 between the host device 104 and the memory device 108 can be a CXL interconnect or comport with at least one CXL standard.

At block 702, a controller is receiving signaling indicative of a read request that is received from a host device and directed to a memory device. The read request includes an address associated with a plurality of addresses of the memory device. For example, the apparatus 102 can operate a package (e.g., the host device 104 and the memory device 108). The link controller 114 of the host device 104 can receive the read request 504 or signaling indicative thereof that includes a read address associated with one of a plurality of address of the memory 120 of the memory device 108. The read request 504 is received from the host device 104 and directed to the memory 120.

At block 704, a write request buffer of the controller is determining that the address of the read request matches an address associated with one or more write requests stored in the write request buffer. For example, the write request buffer 116 of the link controller 114 can determine whether the read address of the read request 504 matches a write address associated with the write requests 502 stored in the write request buffer 116 or the write address buffer 506. The read hit detector 510 can compare the read address of the read request 504 with write addresses stored in the write request buffer 116 or the write address buffer 506 and determine whether the read address matches one of the write addresses associated with the write requests 502 stored in the write request buffer 116.

At block 706, the write request buffer is adding the read request or the signaling indicative of the read request to a response queue associated with the host device in response to determining that the address of the read request matches an address associated with the one or more write requests stored in the write request buffer. For example, responsive to determining that the read address of the read request 504 matches a write address of the write requests 502 stored in the write request buffer 116 or the write address buffer 506, the write request buffer 116 adds the read request 504 or signaling indicative thereof to the response queue 522 associated with the host device 104. The write request buffer 116 or the write data buffer 508 also provides data for the read response associated with the read request 504 or the signaling indicative thereof that corresponds to write data in the write request buffer 116 or the write data buffer 508 with the matching write address of the one or more write requests 502 stored in the write request buffer 116. By adding the read request 504 or the signaling indicative thereof to the response queue 522, the write request buffer 116 services the read request 504 and bypasses the interconnect 106 between the host device 104 and the memory device 108. In this way, the write request buffer 116 can improve the latency and bandwidth of the host device 104 or the processor 110 in accessing the memory 120.

At block 708, the write request buffer is transmitting the read request or the signaling indicative of the read request to a read queue associated with the memory device in response to determining that the address of the read request does not match an address associated with the one or more write requests stored in the write request buffer. For example, responsive to determining that the read address of the read request 504 does not match a write address of the write requests 502 stored in the write request buffer 116 or the write address buffer 506, the write request buffer 116 transmits or adds the read request 504 or the signaling indicative thereof to the read queue 518 associated with the memory device 108. The link controller 114 can transmit the read request 504 or the signaling indicative thereof in the read queue 518 to the memory device 108 via the interconnect 106. The link controller 114 can also package the read request 504 as a flit before transmitting it to the memory device 108 via the interconnect 106.

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 through 5, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although this document describes implementations for a write request buffer in language specific to certain features or methods, the subject of the appended claims is not limited to the described features or methods. Instead, this document discloses the described features and methods as example implementations of a write request buffer.

What is claimed is:

1. A method comprising:
   storing, in a write request buffer of a controller, write requests having unique addresses of a plurality of addresses of a memory device;
   storing an address and corresponding data associated with a most-recent write request at an initial position of the write request buffer;
   receiving, at the controller, signaling indicative of a read request, the signaling being received from a host device and directed to the memory device, the read request including an address associated with the plurality of addresses of the memory device;
   determining, by the write request buffer of the controller, that the address of the read request matches an address associated with a write request of one or more write requests stored in the write request buffer; and
   responsive to determining that the address of the read request matches an address associated with a write request of the one or more write requests stored in the write request buffer, adding the read request or the signaling indicative of the read request to a response queue associated with the host device; or
   responsive to determining that the address of the read request does not match an address associated with a write request of the one or more write requests stored in the write request buffer, transmitting the read request or the signaling indicative of the read request to a read queue associated with the memory device.

2. The method of claim 1, further comprising providing, in response to adding the read request or the signaling indicative of the read request to the response queue associated with the host device, data for a read response associated with the read request that corresponds to data in the write request buffer associated with the matching address of the write request of the one or more write requests stored in the write request buffer.

3. The method of claim 2, further comprising bypassing, in response to adding the read request or the signaling indicative of the read request to the response queue associated with the host device, an interconnect between the host device and the memory device.

4. The method of claim 3, wherein the interconnect comports with at least one Compute Express Link (CXL) standard, and the controller comprises a CXL controller.

5. The method of claim 1, further comprising transmitting, in response to transmitting the read request or the signaling indicative of the read request to the read queue associated with the memory device, the read request or the signaling indicative of the read request to the memory device via an interconnect between the host device and the memory device.

6. The method of claim 5, further comprising packaging the read request in the read queue as a flit before performing the transmitting to the memory device via the interconnect.

7. The method of claim 1, further comprising:
storing, in a write address buffer of the write request buffer, the address associated with the write request of the one or more write requests stored in the write request buffer; and
storing, in a write data buffer of the write request buffer, data associated with the write request of the one or more write requests stored in the write request buffer.

8. The method of claim 7, further comprising determining, by a comparator of the write request buffer, whether the address of the read request matches the address associated with the write request of the one or more write requests stored in the write request buffer.

9. An apparatus comprising:
a link controller coupled to an interconnect, the link controller configured to manage signaling indicative of write requests and read requests directed to a memory device connected to the interconnect; and
a write request buffer that is configured to:
store addresses and data associated with the write requests, the write requests stored in the write request buffer having unique addresses of a plurality of addresses associated with the memory device;
store an address and corresponding data associated with a most-recent write request at an initial position of the write request buffer;
compare addresses associated with the read requests with the unique addresses stored in the write request buffer; and
respond to the read requests using the data stored in the write request buffer in response to the addresses associated with the read requests matching an address of the unique addresses stored in the write request buffer.

10. The apparatus of claim 9, wherein the write request buffer is configured to store the addresses and the data associated with the write requests after the link controller transmits the write requests to the memory device via the interconnect.

11. The apparatus of claim 9, wherein a size of the write request buffer is based on a number of unique write requests between a write request with a write address and a read request with a matching read address.

12. The apparatus of claim 9, wherein the write request buffer is configured to:
determine that the write request buffer comprises a quantity of information that is greater than a threshold; and
remove, invalidate, or overwrite, responsive to storing the address and the corresponding data associated with the most-recent write request and the write request buffer comprising the quantity of information that is greater than the threshold, an address and corresponding data associated with an oldest write request in the write request buffer.

13. The apparatus of claim 9, wherein a buffer depth of the write request buffer is determined based on a reuse distance metric, the reuse distance metric representing an average number of unique write request entries to the write request buffer between an incoming read request that has a same address as an address of a write request stored in the write request buffer and the write request stored in the write request buffer with the same address.

14. The apparatus of claim 9, wherein the write request buffer comprises:
a write address buffer configured to store the unique addresses associated with the write requests; and
a write data buffer configured to store the data associated with the write requests.

15. The apparatus of claim 14, wherein the write request buffer further comprises a comparator configured to determine whether an address associated with a read request directed to the memory device matches an address of the unique addresses stored in the write address buffer.

16. The apparatus of claim 9, wherein the link controller further comprises:
a write queue configured to buffer the write requests directed to the memory device; and
a read queue configured to buffer the read requests directed to the memory device that are not serviced by the write request buffer.

17. The apparatus of claim 9, wherein the interconnect comports with at least one Compute Express Link (CXL) standard.

18. The apparatus of claim 17, wherein the link controller comprises a CXL controller.

19. The apparatus of claim 17, wherein the memory device comprises a Type 1 CXL device, a Type 2 CXL device, or a Type 3 CXL device.

20. An apparatus comprising:
at least one memory array;
a controller coupled to the at least one memory array and configured to manage signaling indicative of write requests and read requests received from a host device via an interconnect and directed to the at least one memory array; and
a write request buffer that is configured to:
store addresses and data associated with the write requests, the write requests stored in the write request buffer having unique addresses of a plurality of addresses associated with the at least one memory array;
store an address and corresponding data associated with a most-recent write request at an initial position of the write request buffer;
compare addresses associated with the read requests with the unique addresses stored in the write request buffer; and
respond to the read requests using the data stored in the write request buffer in response to the addresses associated with the read requests matching an address of the unique addresses stored in the write request buffer.

21. The apparatus of claim 20, wherein the write request buffer is configured to store the addresses and the data associated with the write requests after the controller transmits the write requests to the at least one memory array.

22. The apparatus of claim 20, wherein a size of the write request buffer is based on a number of unique write requests between a write request with a write address and a read request with a matching read address.

23. The apparatus of claim 20, wherein the write request buffer is configured to:
determine that the write request buffer comprises a quantity of information that is greater than a threshold; and
remove, invalidate, or overwrite, responsive to storing the address and the corresponding data associated with the most-recent write request and the write request buffer comprising the quantity of information that is greater than the threshold, an address and corresponding data associated with an oldest write request in the write request buffer.

24. The apparatus of claim 20, wherein a buffer depth of the write request buffer is determined based on a reuse distance metric, the reuse distance metric representing an average number of unique write request entries to the write request buffer between an incoming read request that has a same address as an address of a write request stored in the write request buffer and the write request stored in the write request buffer with the same address.

25. The apparatus of claim 20, wherein the write request buffer comprises:
 a write address buffer configured to store the unique addresses associated with the write requests; and
 a write data buffer configured to store the data associated with the write requests.

26. The apparatus of claim 25, wherein the write request buffer further comprises a comparator configured to determine whether an address associated with a read request directed to the at least one memory array matches an address of the unique addresses stored in the write address buffer.

27. The apparatus of claim 20, wherein the controller further comprises:
 a write queue configured to buffer the write requests directed to the at least one memory array; and
 a read queue configured to buffer the read requests directed to the at least one memory array that are not serviced by the write request buffer.

28. The apparatus of claim 20, wherein the interconnect comports with at least one Compute Express Link (CXL) standard.

29. The apparatus of claim 28, wherein the controller comprises a CXL controller.

30. The apparatus of claim 28, wherein the apparatus comprises a Type 1 CXL device, a Type 2 CXL device, or a Type 3 CXL device.

31. The apparatus of claim 20, wherein the write request buffer is coupled between a link controller of the apparatus and the at least one memory array.

\* \* \* \* \*